(12) United States Patent
Mabuchi

(10) Patent No.: US 9,392,449 B2
(45) Date of Patent: Jul. 12, 2016

(54) COMMUNICATION SYSTEM, COMMUNICATION UNIT, AND COMMUNICATION METHOD

(71) Applicant: Mitsuhiro Mabuchi, Tokyo (JP)

(72) Inventor: Mitsuhiro Mabuchi, Tokyo (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/441,561

(22) PCT Filed: Nov. 18, 2013

(86) PCT No.: PCT/JP2013/081030
§ 371 (c)(1),
(2) Date: May 8, 2015

(87) PCT Pub. No.: WO2014/097793
PCT Pub. Date: Jun. 26, 2014

(65) Prior Publication Data
US 2015/0296376 A1 Oct. 15, 2015

(30) Foreign Application Priority Data

Dec. 20, 2012 (JP) ................................ 2012-277955

(51) Int. Cl.
*H04K 1/00* (2006.01)
*H04W 12/04* (2009.01)
(Continued)

(52) U.S. Cl.
CPC .............. *H04W 12/04* (2013.01); *G06F 21/60* (2013.01); *G06F 21/64* (2013.01); *H04L 1/0063* (2013.01);
(Continued)

(58) Field of Classification Search
CPC ......... G06F 21/60; G06F 21/64; G06F 11/10; H04L 2209/00; H04L 2209/04; H04L 2209/20; H04L 9/30; H04L 63/0428; H04L 7/048; G06Q 20/401
See application file for complete search history.

(56) References Cited

U.S. PATENT DOCUMENTS 3,629,825 A * 12/1971 Bloom, Jr. .............. G06F 11/10
714/800
6,011,848 A * 1/2000 Kanda .................. G06Q 20/401
380/28

(Continued)

FOREIGN PATENT DOCUMENTS

EP 1724933 A1 11/2006
GB 2419261 A 4/2006

(Continued)

OTHER PUBLICATIONS

Communication from the Japanese Patent Office issued Oct. 1, 2014 in counterpart Japanese Patent Application No. 2012-277955.

*Primary Examiner* — Jayesh Jhaveri
(74) *Attorney, Agent, or Firm* — Sughrue Mion, PLLC

(57) ABSTRACT

This communication system ensures the security of a communication message with a low computational load. Communication units are capable of exchanging a communication message containing a check bit. The check bit is used to determine the reliability of the communication message. Communication unit, which transmits the communication message, is equipped with a storage position determination part. The storage position determination part determines one of multiple positions within the communication message where the check bit can be stored as a storage position. The communication unit generates a communication message with the check bit stored at the storage position and transmits the communication message. Communication unit, which receives the communication message, is equipped with a storage position determination part. The storage position determination part determines the storage position of the check bit in the communication message in accordance with the manner the storage position was determined.

10 Claims, 5 Drawing Sheets

(51) Int. Cl.

| | |
|---|---|
| *G06F 21/64* | (2013.01) |
| *G06F 21/60* | (2013.01) |
| *H04L 12/40* | (2006.01) |
| *H04L 9/34* | (2006.01) |
| *H04L 1/00* | (2006.01) |
| *H04W 12/08* | (2009.01) |
| *H04L 29/06* | (2006.01) |
| *G06F 11/10* | (2006.01) |
| *H04L 9/30* | (2006.01) |
| *G06Q 20/40* | (2012.01) |
| *H04L 7/04* | (2006.01) |
| *H03M 13/09* | (2006.01) |

(52) U.S. Cl.
CPC ............ *H04L 9/34* (2013.01); *H04L 12/40169* (2013.01); *H04W 12/08* (2013.01); *G06F 11/10* (2013.01); *G06Q 20/401* (2013.01); *H03M 13/098* (2013.01); *H04L 7/048* (2013.01); *H04L 9/30* (2013.01); *H04L 63/0428* (2013.01); *H04L 2012/40215* (2013.01); *H04L 2209/00* (2013.01); *H04L 2209/04* (2013.01); *H04L 2209/20* (2013.01); *H04L 2209/84* (2013.01)

(56) References Cited

U.S. PATENT DOCUMENTS

| | | | |
|---|---|---|---|
| 6,249,870 | B1 * | 6/2001 | Kobayashi ............ G06T 1/0028 380/54 |
| 6,490,243 | B1 | 12/2002 | Tanaka et al. |
| 8,909,941 | B1 * | 12/2014 | Trimberger ............. G06F 21/64 713/190 |
| 2003/0012228 | A1 | 1/2003 | Tanaka et al. |
| 2003/0012406 | A1 * | 1/2003 | Iwamura ............ H04N 1/32203 382/100 |
| 2003/0043749 | A1 | 3/2003 | Tanaka et al. |
| 2005/0047590 | A1 * | 3/2005 | Liang ................... H04L 9/0838 380/28 |
| 2006/0242416 | A1 * | 10/2006 | Sharma ................... G06T 1/005 713/176 |
| 2010/0299517 | A1 * | 11/2010 | Jukic ................... H04L 63/0823 713/150 |
| 2012/0121084 | A1 * | 5/2012 | Tomlinson ................ H04L 9/30 380/30 |
| 2014/0310530 | A1 | 10/2014 | Oguma et al. |

FOREIGN PATENT DOCUMENTS

| | | |
|---|---|---|
| JP | 11-191758 A | 7/1999 |
| JP | 2004-056762 A | 2/2004 |
| JP | 2013-098719 A | 5/2013 |
| WO | 2008/001419 A1 | 1/2008 |

* cited by examiner

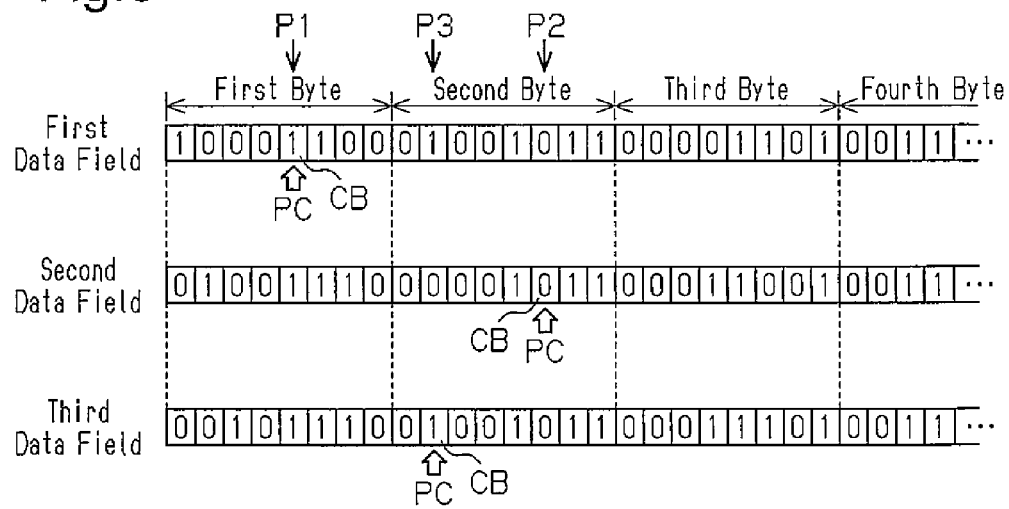

Fig.8
| Bit String | Bit Position |
|---|---|
| 000 | Px |
| 001 | P3 |
| 010 | P2 |
| 100 | P1 |
| 011 | P1 |
| 101 | P2 |
| 110 | P3 |
| 111 | Px |
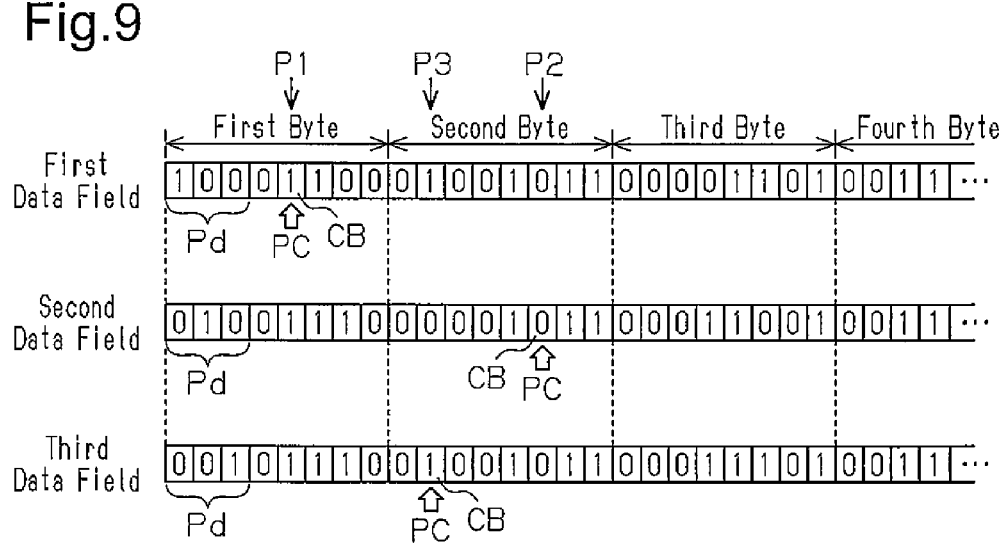
Fig.9
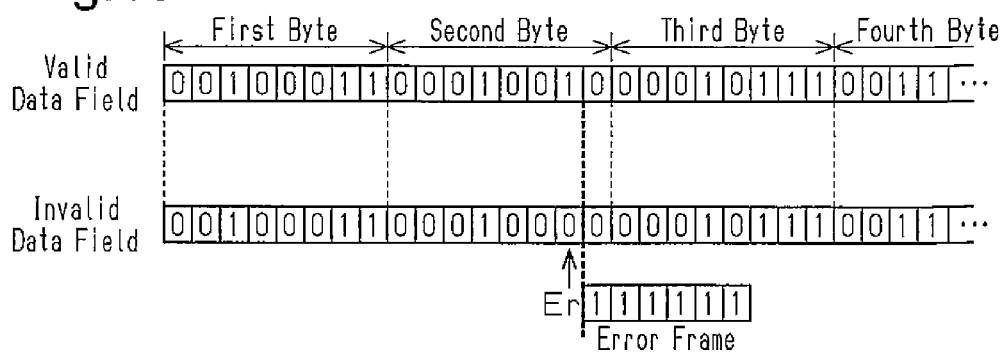
Fig.10

| The Number Of Communications | Bit Position |
|---|---|
| 1 | P3 |
| 2 | P2 |
| 3 | P1 |
| 4 | P3 |
| 5 | P2 |
| 6 | P1 |

| The Number Of Communications | Bit Position |
|---|---|
| 1 | P2 |
| 2 | P3 |
| 3 | P1 |
| 4 | P2 |
| 5 | P1 |
| 6 | P3 |

| Bit String | Bit Position |
|---|---|
| 00 | P3 |
| 01 | P2 |
| 10 | P1 |
| 11 | Px |

COMMUNICATION SYSTEM, COMMUNICATION UNIT, AND COMMUNICATION METHOD

This application is a National Stage of International Application No. PCT/JP2013/081030 filed Nov. 18, 2013, claiming priority based on Japanese Patent Application No. 2012-277955, filed Dec. 20, 2012, the contents of all of which are incorporated herein by reference in their entirety.

FIELD OF THE DISCLOSURE

The present disclosure relates to a communication system that has a plurality of communication devices network-connected to one another in a vehicle or the like. The present disclosure also relates to a communication device and a communication method used in the communication system.

BACKGROUND OF THE DISCLOSURE

As is well known, a plurality of electronic control units (ECUs) mounted in a vehicle usually compose a vehicle network system. These ECUs are network-connected to one another, thereby making it possible to mutually exchange respective pieces of information (vehicle information) of the ECUS. An example of a communication system composing such a vehicle network system is a controller area network (CAN).

By virtue of the CAN, a plurality of ECUs that share a bus, i.e., a communication line, are able to cause a message to flow in a bus, by making determinations by themselves. Accordingly, it is easy to transmit a message to the bus from each ECU. Therefore, for example, if an invalid ECU is connected to the bus of the CAN, an invalid message is likely to be transmitted to the bus. The ECU that has received such an invalid message is likely to process the invalid message in the same manner as a normal message.

Conventionally, a technique for preventing communication provided by an invalid message has also been developed, an example of which is disclosed in Patent Document 1.

The technique disclosed in the Patent Document 1 ensures secrecy of communication data between a master wireless communication device and a slave wireless communication device. The technique uses a secret key shared between the master wireless communication device and the slave wireless communication device. Using a secret key, the master wireless communication device encrypts a self-created encryption key and transfers this encryption key to the slave wireless communication device. Using a common secret key, the slave wireless communication device decrypts the transferred encryption key. Thus, the encryption key is shared between the master wireless communication device and slave wireless communication device. The foregoing technique uses the shared encryption key to encrypt and decrypt communication data exchanged between the master wireless communication device and slave wireless communication device.

PRIOR ART DOCUMENTS

Patent Documents

Patent Document 1: Japanese Laid-Open Patent Publication No. 2004-56762

SUMMARY OF THE INVENTION

Problems that the Invention is to Solve

In the technique in Patent Document 1, security is ensured by using a secret key and an encryption key, each of which has a key size of 128 bits. However, in a communication system in which a communication message requires real time property as in the CAN described above, the load of ensuring security is so heavy that it cannot be ignored. That is, the calculation load and time of 128 bits, which is separately required by encryption and decryption, is so significant that they cannot be ignored. Conversely, if the respective numbers of bits for the secret key and the encryption key are reduced, it is difficult to ensure adequate security.

The objective of the present disclosure is to ensure the security of a communication message with less calculation load.

Means for Solving the Problems

In accordance with one aspect of the present disclosure, a communication system that includes a plurality of communication devices is provided. Each communication device is connected to a communication line such that a communication message including a check bit can be transmitted or received. The check bit is used for determining reliability of the communication message. Among the communication devices, a communication device that transmits the communication message includes a storage position specifying section configured to specify one of a plurality of positions at which the check bit in the communication message can be stored as a storage position at which the check bit is stored. The communication device that transmits the communication message is configured to generate a communication message in which the check bit is stored in the specified storage position and to transmit the generated communication message. Among the communication devices, a communication device that receives the communication message includes a storage position determining section configured to determine the storage position of the check bit in the communication message by causing this storage position to correspond to the storage position specified by the storage position specifying section. The communication device that receives the communication message is configured to acquire the check bit by causing the storage position determining section to determine the storage position of the check bit in the received communication message. The communication device that receives the communication message determines the reliability of the received communication message based on the acquired check bit.

In accordance with another aspect of the present disclosure, a communication method is provided that is used in a communication system having a plurality of communication devices. Each communication device is connected to a communication line such that a communication message including a check bit can be transmitted or received. The check bit is used to determine reliability of the communication message, and a plurality of positions at which the check bit can be stored being present in the communication message. The communication method includes: providing a storage position specifying section for a communication device that transmits a communication message among the communication devices; causing the storage position specifying section to specify one of the positions at which the check bit can be stored as a storage position at which the check bit is stored; generating a communication message in which the check bit is stored at the specified storage position; transmitting the generated communication message; providing a storage position determining section for a communication device that receives the communication message among the communication devices; causing the storage position determining section to determine the storage position of the check bit in the received communication message, wherein the storage position determining section determines the storage position of the check bit by causing this storage position to correspond to the storage position specified by the storage position specifying section; causing the storage position determining section to determine the storage position of the check bit, thereby acquiring the check bit; and determining the reliability of the received communication message based on the acquired check bit.

In accordance with a further aspect of the present disclosure, a communication method for transmitting/receiving a communication message is provided. The communication message includes a check bit for determining reliability of the communication message. A plurality of positions at which the check bit can be stored is present in the communication message. The communication method includes: specifying one of the positions at which the check bit can be stored as a storage position at which the check bit is stored; generating and transmitting a communication message in which the check bit is stored at the specified storage position; receiving the transmitted communication message; determining the storage position of the check bit in the received communication message by causing this storage position correspond to the specified storage position; acquiring the check bit from the determined storage position of the check bit; and determining the reliability of the received communication message based on the acquired check bit.

In accordance with yet another aspect of the present disclosure, a communication device used in a communication system having a plurality of communication devices is provided. Each communication device is connected to a communication line such that a communication message including a check bit can be transmitted or received. The check bit is used for determining reliability of the communication message. A plurality of positions at which the check bit can be stored is present in the communication message. The communication device that transmits the communication message includes a storage position specifying section. The storage position specifying section is configured to specify one of a plurality of positions at which the check bit can be stored as a storage position at which the check bit is stored. The communication device that transmits the communication message is configured to generate a communication message in which the check bit is stored at the specified storage position and to transmit the generated communication message.

In accordance with another aspect of the present disclosure, a communication device used in a communication system having a plurality of communication devices is provided. Each communication device is connected to a communication line such that a communication message including a check bit can be transmitted or received. The check bit is used for determining reliability of the communication message. A plurality of positions at which the check bit can be stored is present in the communication message. The communication message is transmitted in a state where the check bit is stored at one of the positions at which the check bit can be stored. The communication device that receives the communication message has a storage position determining section. The storage position determining section is configured to determine the storage position of the check bit in the received communication message by causing this storage position to correspond to the specified storage position of the check bit. The communication device that receives the communication message is configured to acquire the check bit based on the determined storage position. The communication device that receives the communication message is configured to determine the reliability of the received communication message based on the acquired check bit.

A plurality of positions at which a check bit can be stored is present in one communication message. According to the configurations or methods described above, one of the positions at which a check bit can be stored in a communication message is specified as a storage position at which the check bit is stored. Accordingly, it is difficult to determine the position of the check bit included in the communication message. That is, by using the check bit, the reliability of the communication message is ensured, and the security is improved. Accordingly, even in the event where a communication message is intercepted, it is difficult to estimate the valid check bit. Therefore, for example, it is difficult for a valid check bit to be stored at a valid position in an invalid communication message. Accordingly, communication using a spoofed communication message is prevented. That is, communication using an invalid communication message is made difficult.

The communication device that receives a communication message determines the storage position of a check bit such that the storage position corresponds to the storage position specified by the communication device that transmits the communication message. For example, the rule based on which the reception side (device) determines the storage position corresponds to the rule used for the transmission side (device) to specify the storage position of the check bit. Therefore, the check bit storage position specified by the transmission side can be determined by the reception side. Accordingly, in the foregoing configuration or methods, based on a check bit suitably acquired from communication messages in which the storage position of the check bit can be altered, security of communication messages exchanged between the transmission side and the reception side is ensured. A calculation load for specifying/determining the storage position of the check bit is lighter than a calculation load required where a secret key or encryption key is used. Accordingly, increase in calculation load is restrained.

In accordance with a form of the disclosure, the storage position specifying section is configured to specify the storage position of a check bit based on partial data that is part of data included in the communication message. The storage position determining section is configured to determine the specified storage position of the check bit based on the partial data used to specify the storage position of the check bit.

In this configuration, the storage position of a check bit is specified based on data included in a communication message. Accordingly, conditions for specifying/determining the storage position can easily be synchronized between the communication device that transmits a communication message and the communication device that receives the communication message.

Data included in a communication message often changes irregularly. Therefore, by using such data, irregular changes in the storage position of a check bit is also expected. Specifically, even in the event where a communication message is intercepted, irregular changes in the storage position of the check bit makes it difficult to estimate the storage position of the check bit. Accordingly, since it also makes it difficult to acquire a check bit, security ensured by the check bit is further improved.

In accordance with a form of the disclosure, the storage position specifying section is configured to specify a storage position of a check bit in a communication message such that this storage position is prevented from coinciding with the position of the partial data.

According to this configuration, in a communication message, the storage position of a check bit differs from a position of partial data (the position of part of the data of the communication message) used to specify the storage position of the check bit. Therefore, the check bit does not interfere with the specifying process of the storage position of the check bit. Accordingly, the specifying process of the storage position of the check bit is simplified.

In accordance with a form of the disclosure, the storage position specifying section and the storage position determining section hold an identical secret key, and the storage position specifying section is configured to specify the storage position of the check bit based on a result of encrypting the partial data with the secret key. Also, the storage position determining section is configured to determine the storage position of the check bit based on the result of encrypting the partial data with the secret key.

According to this configuration, it is difficult to obtain the storage position of a check bit from the partial data itself. Therefore, even in the event where the communication message is intercepted, it is difficult to determine the storage position of the check bit. Therefore, the valid check bit cannot be estimated. That is, communication using an invalid communication message is made more difficult, so that security of the communication message is further improved.

In accordance with a form of the disclosure, the communication system is configured such that the communication message is transmitted or received based on a protocol of a controller area network, and the storage position of the check bit is specified to be in a data field of the communication message.

The size of a data field in the controller area network (CAN) is only 64 bits maximum. Therefore, many bits cannot be used to ensure security in the controller area network.

According to the present disclosure, even with the use of a check bit of one to several bit lengths, it is difficult to estimate the storage position of the check bit from an intercepted communication message. Accordingly, it is not easy to obtain the valid check bit. That is, generation of an invalid communication message is difficult, thus ensuring security required for the communication message.

A calculation load in a calculation process for a check bit with fewer bits and a calculation load in a calculation process for specifying or determining the storage position of a check bit from among 64 bits or fewer can also be prevented from becoming excessive and hence can be restrained. Therefore, the present calculating capability of the information processor connected to the communication network of the CAN can be utilized as it is.

Since security is ensured with fewer bits, an increase in communication message increase is also restrained. Accordingly, the communication state of the network system is appropriately maintained and the influence on the entire system is small.

In accordance with a form of the disclosure, the storage position specifying section is configured to count the number of transmissions of the communication message when specifying the storage position of the check bit, and the storage position determining section is configured to count the number of receptions of the communication message when determining the storage position of the check bit.

In this configuration, the number of communication message transmissions and the number of communication message receptions are taken into account to specify/determine the storage position of a check bit. Therefore, even if a communication message is intercepted from at a certain point of the communication message, it is difficult to estimate the storage position of the check bit, thus appropriately ensuring security.

In accordance with a form of the disclosure, the storage position specifying section is configured to prevent the number of transmissions of the communication message from increasing when an error frame corresponding to the latest transmitted communication message is detected.

If an error frame occurs in the communication message, a communication device expected to receive the communication message cannot receive this message. In such a case also, if the communication device for transmitting a communication message increases the number of transmissions, a difference occurs between the number of communication message transmissions by the transmitting communication device and the number of communication message receptions by the receiving communication device.

According to the foregoing configuration, the transmitting communication device does not increase the number of transmissions if it detects an error frame in a communication message transmitted. Therefore, even if an error frame occurs in the communication message, synchronization of the number of transmissions and the number of receptions is maintained. That is, since the synchronization of the numbers of communications is maintained, the storage position of a check bit is specified and determined while the synchronization of the check bit storage positions is appropriately maintained. Therefore, communication message security is maintained.

BRIEF DESCRIPTION OF THE DRAWINGS

FIG. 5 is a table showing a relationship between the number of communications in the communication system in FIG. 1 and the storage positions of check bits.

FIG. 6 is a schematic diagram showing the respective storage positions of check bits in data frames in the communication system in FIG. 1.

FIG. 7 is an explanatory diagram showing an example of a check bit received in the communication system in FIG. 1.

FIG. 8 is a table related to a communication system according to a second embodiment of the present disclosure, showing the correspondence relationship between bit strings of part of data (partial data) of the communication message and the storage positions of the check bits.

FIG. 9 is a schematic diagram of check bit storage positions in data frames in the communication system in FIG. 8.

FIG. 10 is a schematic diagram related to a communication system of a modification of the present disclosure, showing data fields in a case where an error frame is detected.

FIG. 11 is a table related to another modification of the present disclosure, showing the correspondence relationship between the number of communications and the storage positions of check bits.

FIG. 12 is a table related to another embodiment of the present disclosure, showing the correspondence relationship between the number of communications and the storage positions of check bits.

FIG. 13 is a table related to yet another embodiment of the present disclosure, showing the correspondence relationship between the bit strings of part of data (partial data) of a communication message and the storage positions of check bits.

DETAILED DESCRIPTION OF THE PREFERRED EMBODIMENTS

First Embodiment

FIGS. 1 to 7 illustrate a communication system according to a first embodiment of the present disclosure.

Figure 1:
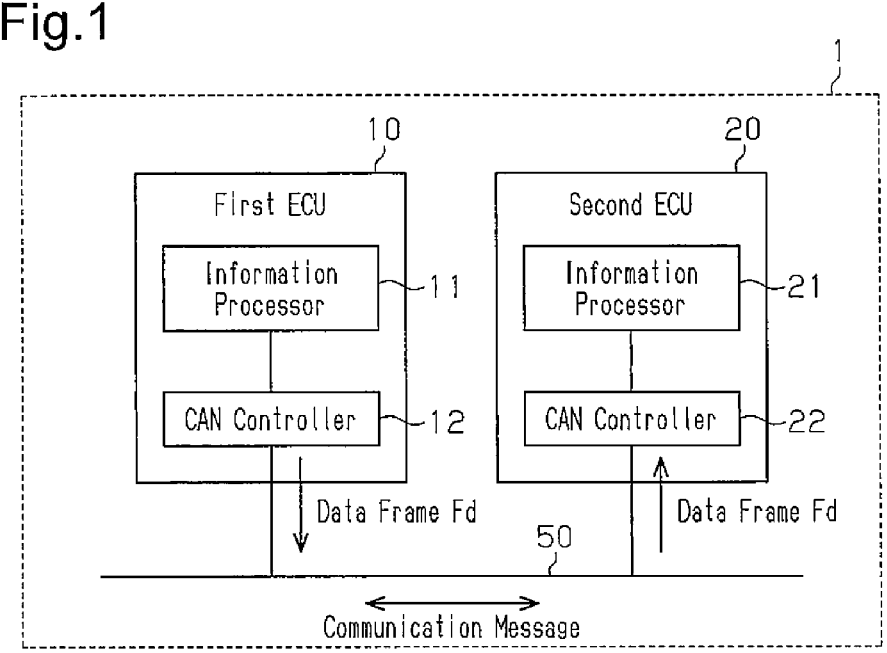
FIG. 1 is a block diagram of a schematic configuration showing a communication system having a plurality of communication devices according to a first embodiment of the present disclosure.

As shown in FIG. 1, a vehicle 1 includes a communication system as a vehicle network system. The communication system comprises a first electronic control unit (ECU) 10, a second ECU 20, and a communication bus 50 for connecting the first ECU 10 and the second ECU 20 to allow them to communicate with each other. Therefore, the first ECU 10 and the second ECU 20 are able to mutually exchange (transmit and receive) various pieces of information and the like for control via the communication bus 50. The communication system is configured as a controller area network (CAN) and, therefore, a CAN protocol is applied as a communication protocol.

The communication bus 50 comprises a communication line such as a twist cable. A communication message serving as a unit of CAN protocol communication is transmitted via the communication line. The communication bus 50 may include, as part of its communication route, wireless communication, or a route that goes through other networks via a gateway.

In the CAN protocol, four types of frame are prescribed as a frame, which is a communication message structure. One of them is a data frame Fd in which communication data specified by the user can be stored.

Figure 2:
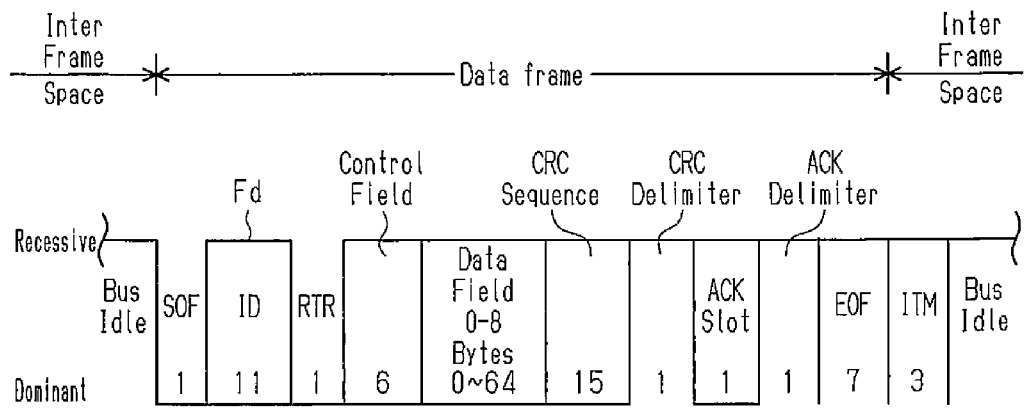
FIG. 2 is a structure diagram of a communication message transmitted or received in the communication system in FIG. 1.

FIG. 2 shows the frame structure of the data frame Fd. The data frame Fd is provided with an area where a message ID indicating the contents of a communication message is stored and a data field area where communication data specified by the user is stored. Generally, communication data specified by the user cannot be stored in areas other than the data field. In the CAN, the data field is set at a length of 0 to 64 bits (8 bits×0 to 8 bytes). That is, in order to ensure security of the communication message in the CAN, it is not desirable for security data to use more than 64 bits. This is because the security data cannot fall only in one communication message. Even with security data having 64 bits or fewer, it is not desirable to overcrowd the area where communication data originally intended to be transferred will be stored. Therefore, it is desired that required security be 8 bits (1 byte) or fewer while more areas for communication data are ensured. It is desired that required security be ensured by security data falling in a range from 1 byte to 2 bytes even if the security data is made larger to some extent.

As shown in FIG. 1, each of the first ECU 10 and the second ECU 20 is a control device used for various controls for the vehicle 1, and is an ECU that controls a driving system, a traveling system, a vehicle body system, or an information apparatus system, or the like. For example, as an ECU for controlling the driving system, an engine ECU is used, and as an ECU for controlling the traveling system, a steering ECU and a brake ECU are used. As an ECU for controlling the vehicle body system, a light ECU or a window ECU is used, as an ECU for controlling the information apparatus system, a car navigation ECU is used.

The first ECU 10 includes an information processor 11, as a communication device, which performs processing required for various controls and carries out transmission. Additionally, the first ECU 10 includes a CAN controller 12, as a communication device, which transmits and receives communication messages based on the CAN protocol. Since the information processor 11 and the CAN controller 12 are connected via an internal bus, various pieces of data can be exchanged between the information processor 11 and the CAN controller 12.

The CAN controller 12 transmits/receives communication messages to/from the communication bus 50. The CAN controller 12 receives a communication message based on the CAN protocol and also transmits a communication message based on the CAN protocol. That is, the first ECU 10 transmits/receives a communication message to/from the communication bus 50 via the CAN controller 12.

The second ECU 20 is identical in configuration to the first ECU 10. Namely, the second ECU 20 includes an information processor 21 as a communication device for reception and a CAN controller 22 having a function identical to the CAN controller 12 of the first ECU 10. The information processor 21 has a function identical to the information processor 11 of the first ECU 10. That is, the second ECU 20 transmits/receives communication messages to/from the communication bus 50 via the CAN controller 22.

That is, the first ECU 10 and the second ECU 20 are able to mutually exchange, via the corresponding CAN controllers 12, 22, communication messages based on a frame prescribed in the CAN protocol.

Each of the respective information processors 11, 21, of the first ECU 10 and the second ECU 20 comprises a microcomputer having an arithmetic unit (CPU) and a storage device. Namely, each of the information processors 11, 21 includes a calculating unit that performs calculating processing for a control program, a read only memory (ROM) in which the control program and data are stored, and a volatile memory (RAM) in which the result of calculation by the calculating unit is temporarily stored. Therefore, the information processor 11 reads and executes the control program held in the storage device, and thereby provides a control target with a predetermined function, thus controlling the control target.

The information process 11 of the first ECU 10 will now be described.

Figure 3:
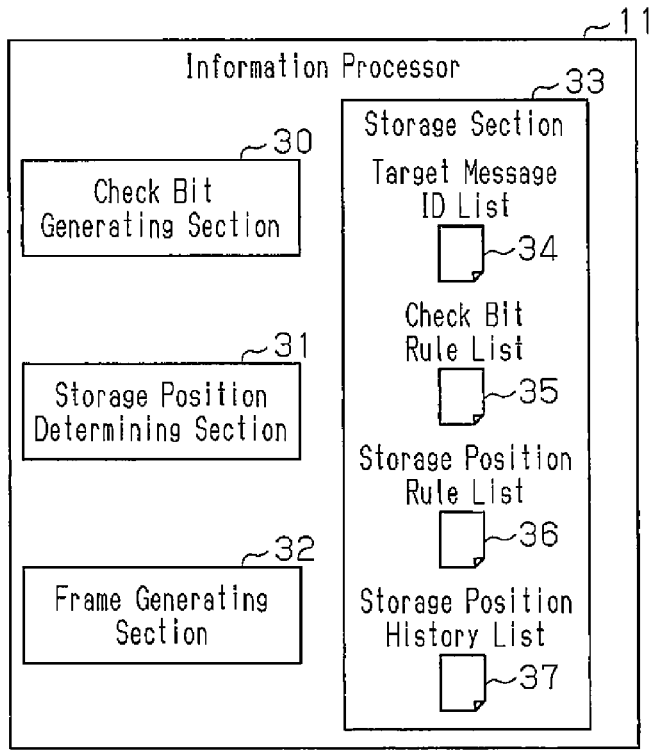
FIG. 3 is a block diagram of the configuration of an information processor, shown in FIG. 1, which transmits the communication message.

As shown in FIG. 3, the information processor 11 includes a check bit generating section 30 that generates a check bit CB (see FIG. 6) used to check the reliability of a communication message. The information processor 11 also includes a storage position specifying section 31, which specifies a position for storing a check bit CB in a communication message. The information processor 11 includes a frame generating section 32 and a storage section 33. The frame generating section 32 generates a frame including communication data in which the check bit CB is stored in a specified position. The storage section 33 holds data used for various processes. The information processor 11 reads and executes a program for generating the check bit CB held in the storage device, a program for specifying a position for storing the check bit CB, and a program for generating a data frame including communication data in which the check bit CB is stored. That is, the information processor 11 has the respective functions of the check bit generating section 30, the storage position specifying section 31, and the frame generating section 32.

The storage section 33 is formed by the entirety or a part of the storage device of the information processor 11. The storage section 33 includes: a target message ID list 34 in which message IDs for ensuring security are set, and a check bit rule list 35 in which rules for altering the value of the check bit CB are set. The storage section 33 includes a storage position rule list 36, in which rules for specifying a storage position as a position for storing the check bit CB have been set, and a storage position history list 37, in which storage position changes have been set as history.

In the target message ID list 34, message IDs are set for ensuring security by the check bit CB and alteration of the storage position of the check bit CB. If a message ID corresponding to communication data has been set in the target message ID list 34, the information processor 11 specifies the check bit CB and a storage position of the check bit CB. In contrast, if the corresponding message ID has not been set in the target message ID list 34, the information processor 11 generates a communication message including no check bit CB.

In the check bit rule list 35, a rule for changing check bits CB has been determined. In the present embodiment, a rule according to which the check bit CB of one bit changes for each transmission has been set, specifically, a rule according to which the check bit CB changes as 01010101 . . . has been set. The check bit rule may be set using a mathematical expression or the like. Alternatively, a check bit string itself may be set. A mathematical expression or the like or a check bit string may be included in a program. Therefore, based on the check bit rule list 35 and the number of transmissions, the information processor 11 specifies whether the check bit CB to be included in the communication data is 0 or 1.

As shown in FIG. 5, in the storage position rule list 36, a rule for specifying storage positions for corresponding check bits CB in communication data have been prescribed. In the present embodiment, in the storage position rule list 36, the numbers of communications have been set in association with corresponding bit positions serving as storage positions.

As shown in FIG. 6, in data fields in the present embodiment, three bit positions P1, P2, P3 have been set in advance, as bit positions that can be used as storage positions.

In the storage position rule list 36, as storage positions, a bit position P1, a bit position P2, and a bit position P3 have been set for the first communication, the second communication, and the third communication, respectively. Similarly, in the storage position rule list 36, as the relationship between the number of communications and the storage positions, a bit position P1, a bit position P2, and a bit position P3 have been set for the fourth communication, the fifth communication, and the sixth communication, respectively. In the storage position rule list 36, the numbers of communications after the sixth time and bit positions corresponding to the numbers may be set. Processing may be performed such that the sixth time is the maximum in setting, and the information processor 11 returns to the first time after the sixth time. In the present embodiment, the bit position P1 corresponds to the fifth bit from the beginning of the data field, the bit position P2 corresponds to the fourteenth bit from the beginning of the data field, and the bit position P3 is the tenth bit from the beginning of the data field. However, each bit position may correspond to any ordinal bit.

Specifically, based on the storage position rule list 36, the information processor 11 specifies one of these three bit positions, P1, P2, and P3 as a storage position according to the number of communications.

As shown in FIG. 3, storage positions specified based on the storage position rule list 36 are stored in the storage position history list 37. For example, in the storage position history list 37, the history of storage positions are stored such that the storage position for the current communication is P3, the storage position for the last communication is P2, the storage position for the last but one communication is P1, and the like. For example, based on the history of the storage position stored in the storage position history list 37, the next storage position can also be confirmed. According to the present embodiment, if the latest storage position is P3, the next storage position is assumed be P1. The present embodiment does not necessarily include the storage position history list 37.

Based on the check bit rule list 35, the check bit generating section 30 generates a check bit CB included in communication data to be transmitted from now. In the present embodiment, the check bit generating section 30 generates 1 if the last check bit CB is 0, and generates 0 if the last check bit CB is 1.

Based on the storage position rule list 36, the storage position specifying section 31 specifies a storage position for storing the check bit CB included in the communication data to be transmitted from now. In the present embodiment, the storage position specifying section 31 specifies the bit position P1 to be the storage position if the communication is the first one, and specifies the bit position P2 to be the storage position if the communication is the second one. The storage position specifying section 31 specifies the bit position P3 to be the storage position if the communication is the third one. Similarly after that, the storage position specifying section 31 specifies the bit position P1 to be the storage position if the communication is the fourth one, and specifies the bit position P2 to be the storage position if the communication is the fifth one. The storage position specifying section 31 specifies the bit position P3 to be the storage position if the communication is the sixth one. Subsequent to the sixth communication, the storage position specifying section 31 returns the first communication and repeats the processing.

Based on the check bit CB generated by the check bit generating section 30 and the storage position specified by the storage position specifying section 31, the frame generating section 32 forms a data frame Fd that has a data field. The data field includes the check bit CB in the specified storage position.

As shown in FIG. 6, in the present embodiment, upon receiving a check bit CB 1 and the bit position P1, the frame generating section 32 generates a data frame Fd that has a data field as shown in a first data field, in which 1 is stored at the bit position P1 as the check bit CB. Upon receiving a check bit CB of 0 and the bit position P2, the frame generating section 32 generates a data frame Fd that has a data field as shown in a second data field, in which 0 is stored at the bit position P2 as a check bit CB. Upon receiving a check bit CB of 1 and the bit position P3, the frame generating section 32 generates a data frame Fd that has a data field as shown in a third data field, in which 1 is stored at the bit position P3 as a check bit CB. In the present embodiment, when a check bit CB is stored at the bit position P1, the other bit positions P2, P3 are used for communication data storage. Similarly, when the check bit CB is stored at the bit position P2, the other bit positions P1, P3 are used for communication data storage; and when the check bit CB is stored at the bit position P3, the other bit positions P2, P3 are used for communication data storage. Therefore, a security ensuring method using check bits CB according to the present embodiment is able to reduce the number of bytes occupying data fields. That is, the foregoing security ensuring method is able to ensure more bytes that allow communication data to be stored in data fields. An increase in communication load on communication messages in the communication bus 50 is also reduced.

The information processor 21 of the second ECU 20 will now be described.

Figure 4:
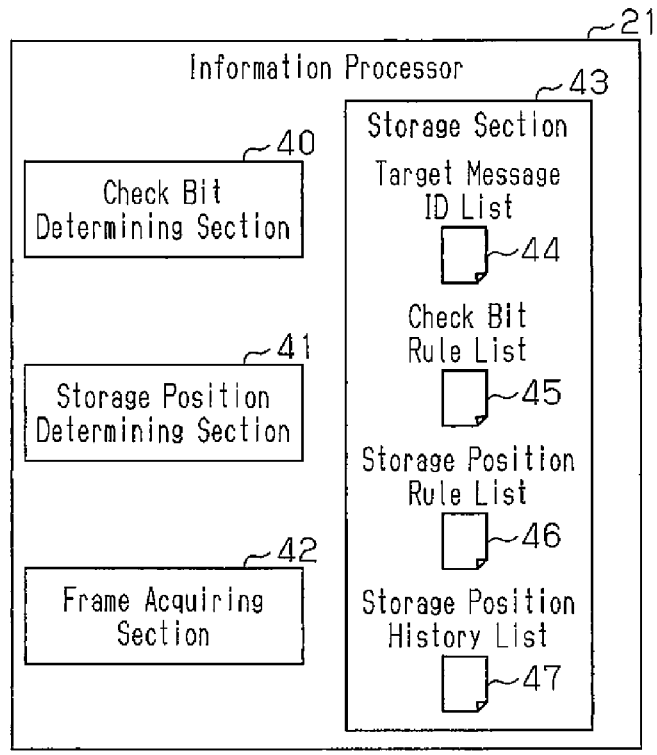
FIG. 4 is a block diagram of the configuration of the information processor, shown in FIG. 1, which receives the communication message.

As shown in FIG. 4, the information processor 21 includes a check bit determining section 40 that determines whether the check bit CB used for checking the reliability of a communication message is valid or invalid and a storage position determining section 41 that determines the position at which the check bit CB in the communication message is stored. The information processor 21 includes a frame acquiring section 42 that acquires a data frame including communication data in which the check bit CB is stored and a storage section 43 holding data used for various processes. The information processor 21 reads and executes, in the calculating unit, a program for determining whether the check bit CB held in the storage device is valid or invalid, a program for determining the position at which the check bit CB is stored, and a program for acquiring a data frame including the communication data in which the check bit CB is stored. That is, the information processor 21 has the respective functions of the check bit determining section 40, the storage position determining section 41, and the frame acquiring section 42.

The storage section 43 is formed by the entirety or a part of the storage device of the information processor 21. The storage section 43 includes a target message ID list 44 in which message IDs for ensuring security are set and a check bit rule list 45 in which rules for altering the value of a check bit CB are set. The storage section 43 includes a storage position rule list 46 in which rules for determining a storage position of the check bit CB has been set and a storage position history list 47 in which storage position changes have been set as history.

In the target message ID list 44, message IDs are set for ensuring security by the check bit CB and alteration of the storage position of the check bit CB. The message ID set in the target message ID list 44 are identical to the message ID set in the target message ID list 34 in the first ECU 10. The target message ID list 44 does not necessarily include message ID not used in the second ECU 20 or may include message ID transmitted by a unit other than the first ECU 10. Therefore, the information processor 21 determines whether the message ID of a communication message acquired has been set in the target message ID list 44. If the message ID of the communication message has been set in the target message ID list 44, the information processor 21 determines the storage position of the check bit CB and determines whether the check bit CB is valid or invalid. Conversely, if the message ID of the communication message has not been set in the target message ID list 44, the information processor 21 processes the communication message as a communication message including no check bit CB.

In the check bit rule list 45, a rule for changing check bits CB has been determined. In the check bit rule list 45, the contents identical to those in the check bit rule list 35 of the first ECU 10 have been set. That is, in the present embodiment, a rule according to which the check bit CB of one bit changes for each transmission has been set, specifically, a rule according to which the check bit CB changes as 01010101 . . . has been set. As long as the check bit rule is identical in contents to that set in the check bit rule list 35 of the first ECU 10, the check bit rule may be set using a mathematical expression or the like or a check bit string itself may be set. A mathematical expression or the like or a check bit string may be included in a program. Therefore, the information processor 21 can determine whether the check bit CB to be included in the acquired communication data is 0 or 1, based on the number of receptions by referring to the check bit rule list 45.

As shown in FIG. 5, in the storage position rule list 46, a rule for specifying storage positions for corresponding check bits CB in communication data have been prescribed. In the present embodiment, in the storage position rule list 46, the associations between the numbers of communications and the corresponding bit positions serving as storage positions have been set. Since the storage position rule list 46 is identical in contents to the storage position rule list 36 of the first ECU 10, detailed explanation thereof will be omitted. As rules set in the storage position rule list 46, the rules (regulations) set in the storage position rule list 36 may be used.

Specifically, based on the storage position rule list 46, the information processor 21 determines one of three bit positions P1, P2, and P3, as a storage position according to the number of communications.

As shown in FIG. 4, based on the storage position rule list 46, storage positions determined from received communication messages are stored in the storage position history list 47. That is, in the storage position history list 47, the history of storage positions are stored such that the storage position for the last communication is P2, the storage position for the last but one communication is P1, and the like. For example, based on the history of the storage position stored in the storage position history list 47, the storage position for this time can also be confirmed. According to the present embodiment, if the storage position for the last communication is P2, the storage position for the current communication is assumed to be P3. The present embodiment does not necessarily include the storage position history list 47.

The frame acquiring section 42 acquires a communication message from the CAN controller 22, and also extracts a data field (communication data) from the acquired communication message (data frame Fd). The frame acquiring section 42 delivers the extracted communication data to the storage position determining section 41 and the check bit determining section 40.

As shown in FIG. 6, in the present embodiment, the frame acquiring section 42 extracts a first field (i.e., communication data) from the first communication message, and extracts a second data field (communication data) from the second communication message. The frame acquiring section 42 extracts a third data field (communication data) from the third communication message. The frame acquiring section 42 extracts a fourth data field (communication data) from the fourth communication message, and extracts a fifth data field (communication data) from the fifth communication message. The frame acquiring section 42 extracts a sixth data field (communication data) from the sixth communication message.

As shown in FIG. 4, based on the storage position rule list 46, the storage position determining section 41 determines (i.e., estimates) the storage position at which the check bit CB included in the communication data received this time is stored. In the present embodiment, the storage position determining section 41 determines the storage position to be the bit position P1 if the communication is the first one, and determines the storage position to be the bit position P2 if the communication is the second one. The storage position determining section 41 determines the storage position to be the bit position P3 if the communication is the third one. Similarly thereafter, the storage position determining section 41 determines the storage position to be the bit position P1 if the communication is the fourth one, and determines the storage position to be the bit position P2 if the communication is the fifth one. The storage position determining section 41 determines the storage position to be the bit position P3 if the communication is the sixth one. The storage position determining section 41 repeats the processing such that subsequent to the sixth communication, the communication returns to the first one.

The check bit determining section 40 acquires a storage position from the storage position determining section 41. Based on the check bit rule list 45, the check bit determining section 40 determines whether the check bit CB included in the communication data received this time is valid or invalid. In the present embodiment, the check bit determining section 40 determines that if the last check bit CB is 0, a check bit CB of 1 is valid this time. The check bit determining section 40 determines that if the last check bit CB is 1, a check bit CB of 0 is valid this time.

As shown in FIG. 7, the check bit determining section 40 acquires a check bit 1 from the bit position P1 of the first data field and, based on the check bit rule list 45, determines whether the check bit CB is valid or invalid. If a check bit is 0 before the first time, a check bit of 1 for the first time is determined to be a valid check bit CB. When a communication message is acquired next, the check bit determining section 40 acquires a check bit of 0 from the bit position P2 of the second data field and, based on the check bit rule list 45, determines whether the check bit CB is valid or invalid. If a check bit is 1 for the first time, a check bit of 0 for the second time is determined to be a valid check bit CB. When a communication message is acquired next, the check bit determining section 40 acquires a check bit of 1 from the bit position P3 of the third data field and, based on the check bit rule list 45, determines whether the check bit CB is valid or invalid. If a check bit is 0 for the second time, a check bit of 1 for the third time is determined to be a valid check bit CB.

If the determination that the check bit CB is invalid is made only once, the communication may be determined to be abnormal. Alternatively, the number of times that the determination is made that the check bit CB is invalid is counted and, if the counted number of times exceeds a predetermined threshold value, the communication may be determined to be abnormal.

Operation of the Present Embodiment will now be Described.

In the first ECU 10, communication data including vehicle information and the like to be transmitted to the second ECU 20 is input to the information processor 11. The information processor 11 selects a message ID corresponding to the input communication data.

Therefore, in the present embodiment, the information processor 11 determines whether the message ID selected to have corresponded to the communication data has been set in the target message ID list 34. If the selected message ID has not been set in the target message ID list 34, the information processor 11 generates, from the input communication data, a communication message including no check bit CB.

If the selected message ID has been set in the target message ID list 34, the information processor 11 specifies a check bit CB and a storage position of the check bit CB.

Specifically, the information processor 11 refers to the check bit rule list 35 and, based on the number of transmissions of the communication data having the message ID, specifies whether the check bit CB to be included in the communication data is 0 or 1.

Subsequently, the information processor 11 refers to the storage position rule list 36 and, based on the number of communications of communication data having the message ID, specifies an arrangement position at which the check bit CB is arranged in the communication data.

The information processor 11 generates a communication message based on communication data in which the check bit CB is stored at the storage position, and transmits the communication message thus generated to the communication bus 50.

When the second ECU 20 receives the communication message, the information processor 21, which has acquired the received communication message, determines whether the message ID included in the communication message is a message ID that has been set in the target message ID list 44. If the message ID of the communication message has not been set in the target message ID list 44, the information processor 21 processes the received communication message as a communication message including no check bit CB.

In contrast, if the message ID of the communication message has been set in the target message ID list 44, the information processor 21 determines the storage position of the check bit CB and determines whether the check bit CB is valid or invalid.

That is, the information processor 21 refers to the storage position rule list 46 and, based on the number of receptions of communication data having the message ID, determines an arrangement position at which the check bit CB is arranged in the communication data.

Subsequently, the information processor 21 acquires the check bit CB from the determined arrangement position. Based on the check bit rule list 45, the information processor 21 also acquires a valid check bit CB based on the number of receptions. A comparison is made between the check bit CB acquired from the arrangement position and the valid check bit CB acquired based on the check bit rule list 45. If these match, it is determined that the communication message is valid, i.e., the reliability is high. If these do not match, it is determined that the communication message is invalid, i.e., the reliability is low.

The communication system according to the present embodiment ensures the security of the communication message by specifying and determining the check bit CB, which is one bit, and the arrangement position at which the check bit CB is arranged. A security ensuring method using check bits CB according to the communication system of the present embodiment is able to reduce the number of bytes occupying data fields. Therefore, the security ensuring method is able to ensure more bytes that allow communication data to be stored in data fields. An increase in communication load on communication messages in the communication bus 50 is also reduced.

The communication system having the communication device of the present embodiment achieves the following advantages.

(1) One of a plurality of positions at which a check bit CB can be stored in a communication message is specified as a storage position at which the check bit CB is stored. Accordingly, it is difficult to determine the position of the check bit CB included in the communication message. That is, ensured reliability, what is called security, of a communication message that uses a check bit CB is improved. Therefore, even in the event where a communication message is intercepted, it is difficult to estimate a valid check bit CB. For example, it is difficult for a valid check bit to be stored at a valid position in an invalid communication message. Communication using a spoofed communication message is prevented, thus making it difficult to communicate via an invalid communication message.

The storage position determining section 41 of the information processor 21 of the second ECU 20 determines the storage position of the check bit CB such that the storage position corresponds to the storage position specified by the specifying section 31 of the first ECU 10. For example, based on the rule (storage position rule list 46) corresponding to the rule (storage position rule list 36) used by the storage position specifying section 31 to specify a storage position of the check bit CB, the storage position determining section 41 determines the storage position of the check bit CB in a communication message. Therefore, the storage position of the check bit CB specified by the first ECU 10 can be determined by the second ECU 20. Accordingly, in the foregoing communication system, based on a check bit CB suitably acquired from communication messages in which the storage position of the check bit CB is altered, security of the communication messages exchanged between the first ECU 10 and the second ECU 20 is ensured. A calculation load for specifying/determining the storage position of the check bit CB is less than a calculation load required when a secret key or encryption key is used. Therefore, an increase in calculation load is restrained.

(2) The controller area network (CAN) where the maximum size of a data field is only 64 bits does not allow many bits to be used for ensuring security.

In the present embodiment, the check bit CB is stored at one storage position specified from among positions in a data field, as described above. Therefore, even in the use of a check bit CB of one-bit length, it is difficult to estimate, from an intercepted communication message, the check bit storage position, at which the check bit CB is stored. Accordingly, a valid check bit CB cannot be obtained. That is, generation of an invalid communication message is difficult, thus ensuring security required for a communication message.

A calculation load in a calculation process for a check bit CB with fewer bits and a calculation load in a calculation process for specifying or determining the storage position of a check bit CB from among 64 bits or fewer can also be restrained. Therefore, the present calculating capability of the information processor connected to the communication network of the CAN can be utilized as is.

Since security is ensured with fewer bits, communication message increase is also restrained. Accordingly, the communication state of the network system is appropriately maintained and the influence on the entire system is small.

(3) To specify/determine the storage position of the check bit CB, the number of communication message transmissions and the number of communication message receptions are taken into account. Even if the communication message is intercepted from a certain point of the communication message, it is difficult to estimate the storage position of the check bit CB, thus appropriately ensuring security.

Second Embodiment

FIGS. 8 and 9 illustrate a communication system having a communication device according to a second embodiment.

The second embodiment differs from the first embodiment in that the second embodiment is configured such that partial data, which is part of data included in a data frame, is used to determine the storage position of the check bit CB. The present embodiment is identical to the first embodiment in configuration except this. The description below focuses on the differences, and detailed explanations of the similar configuration will not be repeated.

As described above, the first ECU 10 has a storage position rule list 36A in the storage section 33.

As shown in FIG. 8, in the storage position rule list 36A, a rule for specifying a storage position of a check bit CB in communication data has been prescribed. In the present embodiment, in the storage position rule list 36A, bit strings, each having three bits, have been set in association with corresponding bit positions serving as storage positions. Each bit string, which has three bits, is compared with partial data that is part of the communication data. Thereby each bit string is used to determine whether it matches the partial data used for the comparison.

As shown in FIG. 9, in data fields in the present embodiment, three bit positions P1, P2, P3 have been set in advance as bit positions that can be used as storage positions. In each data field, a reference position Pd has been set in advance as partial data (part of communication data) used for storage position determination.

In the present embodiment, a bit string matching with data corresponding to the reference position Pd is selected from among bit strings in the storage position rule list 36A. A bit position associated with the selected bit string is specified as the storage position. In the present embodiment, the respective reference positions Pd have been set so as not to coincide with the three bit positions P1, P2, and P3 serving as storage positions.

Specifically, the storage position specifying section 31 refers to the first three bits used for a reference position Pd in communication data to be transmitted, and acquires from the storage position rule list 36A a bit position corresponding to the bit string of this reference position Pd. The bit position thus acquired is specified as a storage position. In the present embodiment, if the three bits for the reference position Pd are 000, the storage position specifying section 31 specifies a bit position Px as a storage position. The bit position Px remains the same as it was the last time communication data was transmitted. If there was no previous communication, a bit position P1, for example, is used. Similarly, if the three bits for the reference position Pd are 001, the storage position specifying section 31 specifies a bit position P3 as a storage position. If the three bits for the storage position Pd are 010, it specifies a bit position P2. If the three bits for the reference position Pd are 100, it specifies a bit position P1. Similarly, if the three bits for the reference position Pd are 011, the storage position specifying section 31 specifies a bit position P1 as a storage position. If the three bits for the reference position Pd are 101, it specifies a bit position P2. If the three bits for the reference position Pd are 110, it specifies a bit position P3. Similarly, if the three bits for the reference position Pd are 111, the storage position specifying section 31 specifies a bit position Px as a storage position.

As shown in FIG. 9, if the bit string for the reference position Pd of the first data field is 100, the bit position P1, which is the fifth bit of the first byte, is specified as a storage position, and 1 is stored at the specified storage position as a first check bit CB. If the bit string for the reference position Pd of the second data field is 010, the bit position P2, which is the sixth bit of the second byte, is specified as a storage position, and 0 is stored at the specified storage position as a second check bit CB. If the bit string for the reference position Pd of the third data field is 001, the bit position P3, which is the second bit of the second byte, is specified as a storage position, and 1 is stored at the specified storage position as a third check bit CB.

As described above, the second ECU 20 has a storage position rule list 46A in the storage section 43.

As shown in FIG. 8, in the present embodiment, in the storage position rule list 46A, a rule corresponding to the rule set in the storage position rule list 36A of the first ECU 10 has been prescribed as a rule for determining the storage positions of corresponding check bits CB. The rule set in the storage position rule list 46A may be identical to that set in the storage position rule list 36A as long as a storage position can be determined.

In the present embodiment, the storage position determining section 41 compares data corresponding to the reference position Pd of an acquired data field, with the bit strings in the storage position rule list 36A, and specifies, as a storage position, the bit position assigned to the bit string matching the data.

As shown in FIG. 9, based on the fact that the bit string of the reference position Pd of the acquired first data field is 100, the storage position determining section 41 determines that the bit position P1 is the storage position. Similarly, based on the fact that the bit string of the reference position Pd of the acquired second data field is 010, the storage position determining section 41 determines that the bit position P2 is the storage position. Based on the fact that the bit string of the reference position Pd of the acquired third data field is 001, the storage position determining section 41 determines that the bit position P3 is the storage position.

A check bit determining section 40 acquires the storage position determined by the storage position determining section 41 and, based on the check bit rule list 45, it also determines whether the check bit CB included in the communication data received this time is valid or invalid. Specifically, the check bit determining section 40 acquires a check bit of 1 from the bit position P1 of the first data field and, based on the check bit rule list 45, determines whether the check bit CB is valid or invalid. When a communication message is acquired next time, the check bit determining section 40 acquires a check bit of 0 from the bit position P2 of the second data field and, based on the check bit rule list 45, determines whether the check bit CB is valid or invalid. When a communication message is acquired next time, the check bit determining section 40 acquires a check bit of 1 from the bit position P3 of the third data field and, based on the check bit rule list 45, determines whether the check bit CB is valid or invalid.

That is, the communication system according to the present embodiment also ensures the security of the communication message by specifying and determining a check bit CB, which is one bit, and the arrangement position at which the check bit CB is arranged.

The communication system having the communication device of the present embodiment achieves the following advantages in addition to the advantages (1) to (3) of the first embodiment.

(4) The storage position of the check bit CB is specified based on data included in the communication message. Accordingly, conditions for specifying/determining a storage position can easily be synchronized between the information processor 11 of the first ECU 10 and the information processor 21 of the second ECU 20.

Data included in a communication message often changes irregularly. Therefore, by virtue of the use of such data, irregular changes in the storage position of the check bit CB are also expected. Specifically, even in the event where a communication message is intercepted, irregular changes in the storage position of a check bit CB makes it difficult to estimate the storage position of the check bit CB. Accordingly, since it also makes it difficult to acquire a check bit CB, security ensured by the check bit CB is further improved.

(5) In a communication message, the storage position of a check bit CB and partial data (part of data) for specifying the storage position of the check bit CB are rendered different from each other. Therefore, the check bit CB does not interfere with the specifying process of the storage position of the check bit CB. Accordingly, the specifying process of the storage position of the check bit CB is simplified.

Other Embodiments

The above described embodiments may be modified as follows.

In each of the above illustrated embodiments, the description is given using an example where communication data is stored in bit positions not used as storage positions among bit positions P1, P2, and P3. The invention is not limited to this. Instead of communication data, dummy data may be inserted in the bit positions not used as the storage positions. Accordingly, even in the event where a communication message is intercepted, it is difficult to acquire a storage position and to acquire a check bit stored at the storage position, thus maintaining the security of the communication message.

In each of the above illustrated embodiments, a description is given using an example where the number of bit positions serving as storage positions is three. However, the invention is not limited to this, and the number of bit positions serving as storage positions may be two or fewer, or four or more. Accordingly, the flexibility in the design of a communication system is improved.

In the first embodiment, a description is given using an example where the relationship between the numbers of communications and the corresponding bit positions set in the storage position rule lists 36, 46 is as shown in FIG. 5. However, the invention is not limited to this. As long as the relationship between the numbers of communications and corresponding bit positions are obvious, the invention is not limited to the relationship between the numbers of communications and the corresponding bit positions, set in these storage position rule lists.

As shown in FIG. 11, storage positions to be specified and determined may be set as in storage position rule lists 36B, 46B. Specifically, in the storage position rule lists 36B, 46B, the storage positions may be set as follows: if the communication is the first one, the bit position P3 is used; if the communication is the second one, the bit position P2 is used; if the communication is the third one, the bit position P1 is used; if the communication is the fourth one, the bit position P3 is used; if the communication is the fifth one, the bit position P2 is used; and if the communication is the sixth one, the bit position P1 is used.

As shown in FIG. 12, storage positions to be specified and determined may be set as in storage position rule lists 36C, 46C. Specifically, in the storage position rule lists 36C, 46C, the storage positions may be set as follows: if the communication is the first one, the bit position P2 is used; if the communication is the second one, the bit position P3 is used; if the communication is the third one, the bit position P1 is used; if the communication is the fourth one, the bit position P2 is used; if the communication is the fifth one, the bit position P1 is used; and if the communication is the sixth one, the bit position P3 is used.

Accordingly, the flexibility in the design of a communication system is improved.

In the first embodiment, based on the number of transmissions by the first ECU 10 and the number of receptions by the second ECU, that is, the number of communications, the specifying operation and the determining operation of the storage position, the determining operation of the check bit CB, and the operation for determining whether the check bit CB is valid or invalid are carried out. That is, the number of communications ensures synchronization required for the specifying operation and the determining operation of the storage position, the determining operation of the check bit CB, and the operation for determining whether the check bit CB is valid or invalid. However, if an error frame occurs in the communication message transmitted by the first ECU 10, the communication message having the error frame is not received by the second ECU 20. Therefore, unless measures are taken, although the number of transmissions by the first ECU 10 increases, the number of receptions by the second ECU 20 does not increase and remains as is. Consequently, a difference is likely to occur between the number of transmissions and the number of receptions. That is, the counts of the numbers of communications are likely to be out of synchronization.

As shown in FIG. 10, if an error frame occurs in the communication message transmitted by the first ECU 10, the first ECU 10 may return the number of transmissions to the previous one based on detection of the error frame, that is, the number of transmissions may be reduced by one. Therefore, even if an error frame occurs in the communication message, synchronization of counting the number of transmissions and counting the number of receptions is maintained. Accordingly, the specifying operation and the determining operation of the storage position of a check bit in the present embodiment are kept synchronized, thus appropriately ensuring security of the communication message.

In the second embodiment, a description is given using an example where the reference position Pd uses the first three bits of each data field. However, the invention is not limited to this. As long as a reference position is included in each data field, any part other than the first three bits in the data field may alternatively be used as the reference position.

In the second embodiment, the description is given using an example where a series of three bits is used for each reference position Pd. However, the invention is not limited to this. Any indication that is able to acquire a required number of bits may be used. Three bits may not come in a series partly or may not come in a series at all.

In the second embodiment, a description is given using an example where three bits are used for each reference position Pd. However, the invention is not limited to this. Two or fewer bits or four or more bits may be used for the reference position. A smaller number of bits further reduces the calculation load, whereas a larger number of bits improves the security.

In each of the storage position rule lists 36D, 46D shown in FIG. 13, the relationship between the bit strings and the corresponding bit positions in the case of a bit string consisting of two bits is set. In the case of a bit string consisting of two bits, four bit positions can be specified. For example, if the bit string is 00, the bit position P3 is set, and if the bit string is 01, the bit position P2 is set. For example, if the bit string is 10, the bit position P1 is set, and if the bit string is 11, the bit position Px is set.

Even with at least one or more of these aspects, the flexibility in the design of a communication system is improved, and the expansion of application range is also expected.

In the second embodiment, a description is given using an example where the bit string of each reference position Pd and a storage position do not coincide with each other. However, the invention is not limited to this. The bit string of each reference position and a storage position may coincide with each other. As long as a check bit to be included in a storage position is predetermined, the bit string of a reference position can be estimated even where the bit string of the reference position and the storage position of the check bit coincide with each other. Therefore, it is also possible to specify the storage position. Accordingly, the flexibility in the design of a communication system is improved.

In the second embodiment, a description is given using an example where three bits acquired from each reference position Pd are used as are, in order to specify/determine a bit position. However, the invention is not limited to this. Three bits acquired from each reference position Pd may be, for example, converted. For example, a common rule for conversion, such as the identical secret key, is set in respective information processors on the transmission side and reception side. Three bits acquired from each reference position Pd are converted based on the common rule. The converted three bits are applied in the storage position rule lists, thereby specifying a bit position (storage position).

Therefore, even in the event where the communication message is intercepted, it is difficult to specify and determine the storage position of the check bit. That is, a valid check bit cannot be estimated. Accordingly, communication using an invalid communication message is made difficult, so that security of the communication message is further improved.

Where a bit position is specified/determined based on the number of communications as in the first embodiment, the number of communications is converted with a secret key. The converted number of communications is applied in the storage position rule lists, thereby acquiring a bit position. Therefore, even in the event where the communication message is intercepted, it is difficult to determine the storage position. Accordingly, security of the communication message is further improved.

In each of the above illustrated embodiments, a description is given using an example where the first and second ECUs 10 and 20 are connected to the communication bus 50. However, the invention is not limited to this, and three or more ECUs or the like may be connected to the communication bus. Accordingly, range of application in such a communication system is broadened.

In each of the above illustrated embodiment, a description is given using an example where the first and second ECUs 10 and 20 are connected to the communication bus 50. However, the invention is not limited to this. For example, a gateway or other various devices may be connected to the networks, instead of the ECUs. Therefore, the communication device according to the present embodiment can also be applied in various devices connected to the network, thus improving communication message security.

In each of the above illustrated embodiments, a description is given using an example where security between the first and second ECUs 10 and 20 is ensured. However, the invention is not limited to this. The present invention may be used in order to ensure security of every communication message exchanged among more ECUs. Accordingly, the range of application in such a communication system is broadened.

In each of the above illustrated embodiments, a description is given using an example where the network corresponds to the CAN protocol. Such a network is called CAN network. However, the invention is not limited to this. The network may be another type of network such as Ethernet (R) or FlexRay (R). Accordingly, the communication devices according to the present invention can also be applied in various networks mounted in a vehicle, thus making it possible to reduce the communication data to be transmitted.

In each of the above illustrated embodiments, a description is given using an example where the vehicle 1 is an automobile. However, the invention is not limited to this. The communication systems may be provided for moving bodies other than an automobile or vehicle: for example, boats and ships, trains, industrial machines, or robots.

DESCRIPTION OF THE REFERENCE NUMERALS

1 . . . Vehicle, 10 . . . First ECU (First Electronic Control Unit), 11 . . . Information processor, 12 . . . CAN controller, 20 . . . Second ECU, 21 . . . Information processor, 22 . . . CAN controller, 30 . . . Check bit generating section, 31 . . . Storage position specifying section, 32 . . . Frame generating section, 33, 43 . . . Storage section, 34, 44 . . . Target message ID list, 35, 45 . . . Check bit rule list, 36, 36A, 36B, 36C, 36D, 46, 46A, 46B, 46C, 46D . . . Storage position rule list, 37, 47 . . . Storage position history list, 40 . . . Check bit determining section, 41 . . . Storage position determining section, 42 . . . Frame acquiring section, 50 . . . Communication bus, CB . . . Check bit, Fd . . . Data frame, P1 . . . Bit position, P2 . . . Bit position, P3 . . . Bit position, Pd . . . Reference position, Px . . . Bit position.

The invention claimed is:

1. A communication system comprising a plurality of communication devices, wherein
each communication device is connected to a communication line such that a communication message including a check bit can be transmitted or received, the check bit being used for determining reliability of the communication message,
among the communication devices, a communication device that transmits the communication message includes a storage position specifying section configured to specify one of a plurality of positions at which the check bit in the communication message can be stored as a storage position at which the check bit is stored,
the communication device that transmits the communication message is configured to generate a communication message in which the check bit is stored in the specified storage position and to transmit the generated communication message,
among the communication devices, a communication device that receives the communication message includes a storage position determining section configured to determine the storage position of the check bit in the communication message by causing this storage position to correspond to the storage position specified by the storage position specifying section,
the communication device that receives the communication message is configured to acquire the check bit by causing the storage position determining section to determine the storage position of the check bit in the received communication message, and
the communication device that receives the communication message determines the reliability of the received communication message based on the acquired check bit;
wherein the storage position specifying section is configured to specify the storage position of the check bit based on partial data that is part of data included in the communication message, and
the storage position determining section is configured to determine the specified storage position of the check bit based on the partial data used to specify the storage position of the check bit.

2. The communication system according to claim 1, wherein the storage position specifying section is configured to specify a storage position of a check bit in a communication message such that this storage position is prevented from coinciding with the position of the partial data.

3. The communication system according to claim 1, wherein
the storage position specifying section and the storage position determining section hold an identical secret key,
the storage position specifying section is configured to specify the storage position of the check bit based on a result of encrypting the partial data with the secret key, and the storage position determining section is configured to determine the storage position of the check bit based on the result of encrypting the partial data with the secret key.

4. The communication system according to claim 1, wherein
the communication system is configured such that the communication message is transmitted or received based on a protocol of a controller area network, and
the storage position of the check bit is specified to be in a data field of the communication message.

5. The communication system according to claim 1, wherein
the storage position specifying section is configured to count a number of transmissions of the communication message when specifying the storage position of the check bit, and
the storage position determining section is configured to count a number of receptions of the communication message when determining the storage position of the check bit.

6. The communication system according to claim 5, wherein the storage position specifying section is configured to prevent the number of transmissions of the communication message from increasing when an error frame corresponding to the latest transmitted communication message is detected.

7. A communication method used in a communication system having a plurality of communication devices, wherein each communication device is connected to a communication line such that a communication message including a check bit can be transmitted or received, the check bit being used to determine reliability of the communication message, and a plurality of positions at which the check bit can be stored being present in the communication message, the communication method comprising:
providing a storage position specifying section for a communication device that transmits a communication message among the communication devices;
causing the storage position specifying section to specify one of the positions at which the check bit can be stored as a storage position at which the check bit is stored;
generating a communication message in which the check bit is stored at the specified storage position;
transmitting the generated communication message;
providing a storage position determining section for a communication device that receives the communication message among the communication devices;
causing the storage position determining section to determine the storage position of the check bit in the received communication message, wherein the storage position determining section determines the storage position of the check bit by causing this storage position to correspond to the storage position specified by the storage position specifying section;
causing the storage position determining section to determine the storage position of the check bit, thereby acquiring the check bit; and
determining the reliability of the received communication message based on the acquired check bit;
wherein the storage position specifying section is configured to specify the storage position of the check bit based on partial data that is part of data included in the communication message, and
the storage position determining section is configured to determine the specified storage position of the check bit based on the partial data used to specify the storage position of the check bit.

8. A communication method for transmitting/receiving a communication message, the communication message including a check bit for determining reliability of the communication message, and a plurality of positions at which the check bit can be stored being present in the communication message, the communication method comprising:
- specifying one of the positions at which the check bit can be stored as a storage position at which the check bit is stored, wherein the specifying is based on partial data that is part of data included in the communication message;
- generating and transmitting a communication message in which the check bit is stored at the specified storage position;
- receiving the transmitted communication message;
- determining the storage position of the check bit in the received communication message by causing this storage position correspond to the specified storage position, wherein the determining is based on the partial data used to specify the storage position of the check bit;
- acquiring the check bit from the determined storage position of the check bit; and
- determining the reliability of the received communication message based on the acquired check bit.

9. A communication device used in a communication system having a plurality of communication devices, each communication device being connected to a communication line such that a communication message including a check bit can be transmitted or received, the check bit being used for determining reliability of the communication message, and a plurality of positions at which the check bit can be stored being present in the communication message, wherein
- the communication device that transmits the communication message includes a storage position specifying section,
- the storage position specifying section is configured to specify one of a plurality of positions at which the check bit can be stored as a storage position at which the check bit is stored, wherein the storage position specifying section is configured to specify the storage position of the check bit based on partial data that is part of data that is included in the communication message, and
- the communication device that transmits the communication message is configured to generate a communication message in which the check bit is stored at the specified storage position and to transmit the generated communication message.

10. A communication device used in a communication system having a plurality of communication devices, each communication device being connected to a communication line such that a communication message including a check bit can be transmitted or received, the check bit being used for determining reliability of the communication message, a plurality of positions at which the check bit can be stored being present in the communication message, and the communication message being transmitted in a state where the check bit is stored at a specified storage position among one of the plurality of positions at which the check bit can be stored, wherein
- the communication device that receives the communication message has a storage position determining section,
- the storage position determining section is configured to determine the storage position of the check bit in the received communication message by causing this storage position to correspond to the specified storage position of the check bit, wherein the storage position determining section is configured to determine the specified storage position of the check bit based on partial data that is part of data that is included in the communication message, the partial data used in obtaining the specified storage position of the check bit,
- the communication device that receives the communication message is configured to acquire the check bit based on the determined storage position, and
- the communication device that receives the communication message is configured to determine the reliability of the received communication message based on the acquired check bit.

* * * * *